United States Patent
Nakaso et al.

(10) Patent No.: US 8,625,178 B2
(45) Date of Patent: Jan. 7, 2014

(54) IMAGE FORMING APPARATUS, IMAGE FORMATION CONTROL APPARATUS, AND COMPUTER READABLE MEDIUM STORING PROGRAM

(75) Inventors: Suguru Nakaso, Kanagawa (JP); Shinji Hasegawa, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 321 days.

(21) Appl. No.: 12/855,350

(22) Filed: Aug. 12, 2010

(65) Prior Publication Data

US 2011/0194162 A1 Aug. 11, 2011

(30) Foreign Application Priority Data

Feb. 5, 2010 (JP) ................................. 2010-023780

(51) Int. Cl.
- *G03F 3/08* (2006.01)
- *H04N 1/60* (2006.01)
- *G06K 9/40* (2006.01)
- *B41J 29/38* (2006.01)

(52) U.S. Cl.
USPC ................. 358/518; 358/1.9; 382/254; 347/6

(58) Field of Classification Search
USPC .......................... 358/518, 1.9; 347/6; 382/254
See application file for complete search history.

(56) References Cited

U.S. PATENT DOCUMENTS

2004/0114166 A1* 6/2004 Kubo ............................. 358/1.9
2006/0279589 A1* 12/2006 Yasutomi et al. ................. 347/6

FOREIGN PATENT DOCUMENTS

JP A-2007-19602 1/2007

* cited by examiner

*Primary Examiner* — Marivelisse Santiago Cordero
*Assistant Examiner* — Temitayo Folayan
(74) *Attorney, Agent, or Firm* — Oliff & Berridge, PLC

(57) ABSTRACT

An image forming apparatus includes an obtaining unit, an image forming section, and a controller. The obtaining unit obtains color signals containing color components the number of which is n, n being a natural number. The image forming section forms an image on a medium, the image being based on the color signals obtained by the obtaining unit. The controller performs control so that colors in a color gamut that is not reproduced if area coverage modulation, not density modulation, is used for expression are included in the image by expressing densities of the n color components contained in the color signals obtained by the obtaining unit by using density modulation and area coverage modulation.

7 Claims, 9 Drawing Sheets

IMAGE FORMING APPARATUS, IMAGE FORMATION CONTROL APPARATUS, AND COMPUTER READABLE MEDIUM STORING PROGRAM

CROSS-REFERENCE TO RELATED APPLICATIONS

This application is based on and claims priority under 35 USC 119 from Japanese Patent Application No. 2010-023780 filed Feb. 5, 2010.

BACKGROUND (i) Technical Field

The present invention relates to an image forming apparatus, an image formation control apparatus, and a computer readable medium storing a program.

SUMMARY

According to an aspect of the invention, there is provided an image forming apparatus including an obtaining unit, an image forming section, and a controller. The obtaining unit obtains color signals containing color components the number of which is n, n being a natural number. The image forming section forms an image on a medium, the image being based on the color signals obtained by the obtaining unit. The controller performs control so that colors in a color gamut that is not reproduced if area coverage modulation, not density modulation, is used for expression are included in the image by expressing densities of the n color components contained in the color signals obtained by the obtaining unit by using density modulation and area coverage modulation.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the attached drawings.

First, a basic principle of the exemplary embodiment will be described.

In recent years, apparatuses that deal with images having a color gamut different from that of conventional printed material have been increasing due to the dissemination of personal computers (PCs) and the development of displays. Conventional printed material is expressed using a color gamut called "Japan Color". Meanwhile, in digital cameras, for example, a color gamut called "sRGB" or "Adobe RGB" is normally used to cover a wider range of colors. Thus, colors of printed material actually output from a printer may be considerably different from colors viewed on a display.

Two methods are available as a method for addressing such a problem. One is a method for covering a color gamut by increasing the number of colors used in a printer from the conventional four (YMCK) to six or seven. The other is a method for enabling output of a color gamut corresponding to a display by changing the color hue of the currently used four colors.

However, the necessity of greatly changing the body of a printer arises in the former method, whereas the color gamut of conventionally output printed material is not satisfied in the latter method.

Accordingly, the exemplary embodiment enables output of both the color gamut of Japan Color, which is suitable for printed material, and the color gamut of sRGB, which is close to the color gamut on a display, while using the conventional four colors (YMCK).

Now, a conventional typical color expression method will be described.

In the typical color expression method, solid colors are placed at the periphery of a color gamut, and lighter colors (on an inner side of the color gamut) are expressed by generating halftone through a screen process. Such a color expression method is called area coverage modulation.

Figure 1A:
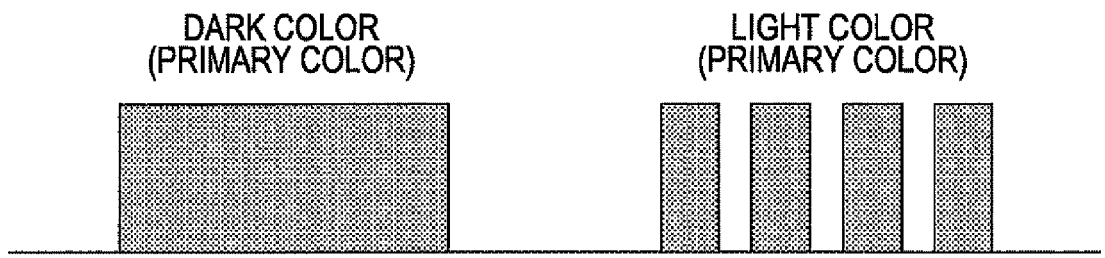
FIGS. 1A and 1B are diagrams illustrating the states of toner on a sheet in a case where a conventional typical color expression method is used.
Figure 1B:
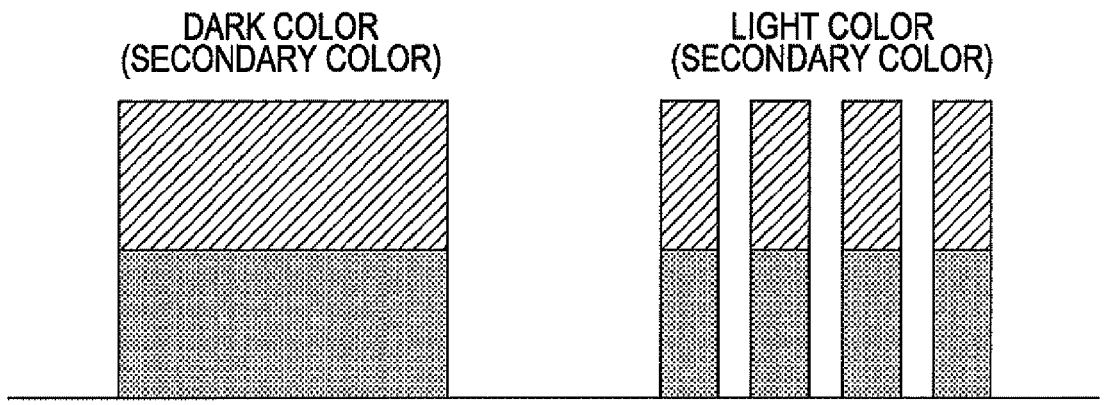

FIGS. 1A and 1B illustrate the state of toner on a sheet in a case where a dark color is reproduced and the state of toner on a sheet in a case where a light color is reproduced by using the typical color expression method. Among those figures, FIG. 1A illustrates the state of toner when a primary color is reproduced, and FIG. 1B illustrates the state of toner when a secondary color is reproduced by mixing primary colors. As is clear from the figures, in this typical color expression method, a light color is expressed using halftone for each of the primary color and the secondary color. The right side in FIG. 1B is a schematic view. Actually, two toners that are overlapped may deviate from each other depending on the manner of a screen process. Here, overlapping of all the two or more toners is not always necessary.

Figure 2:
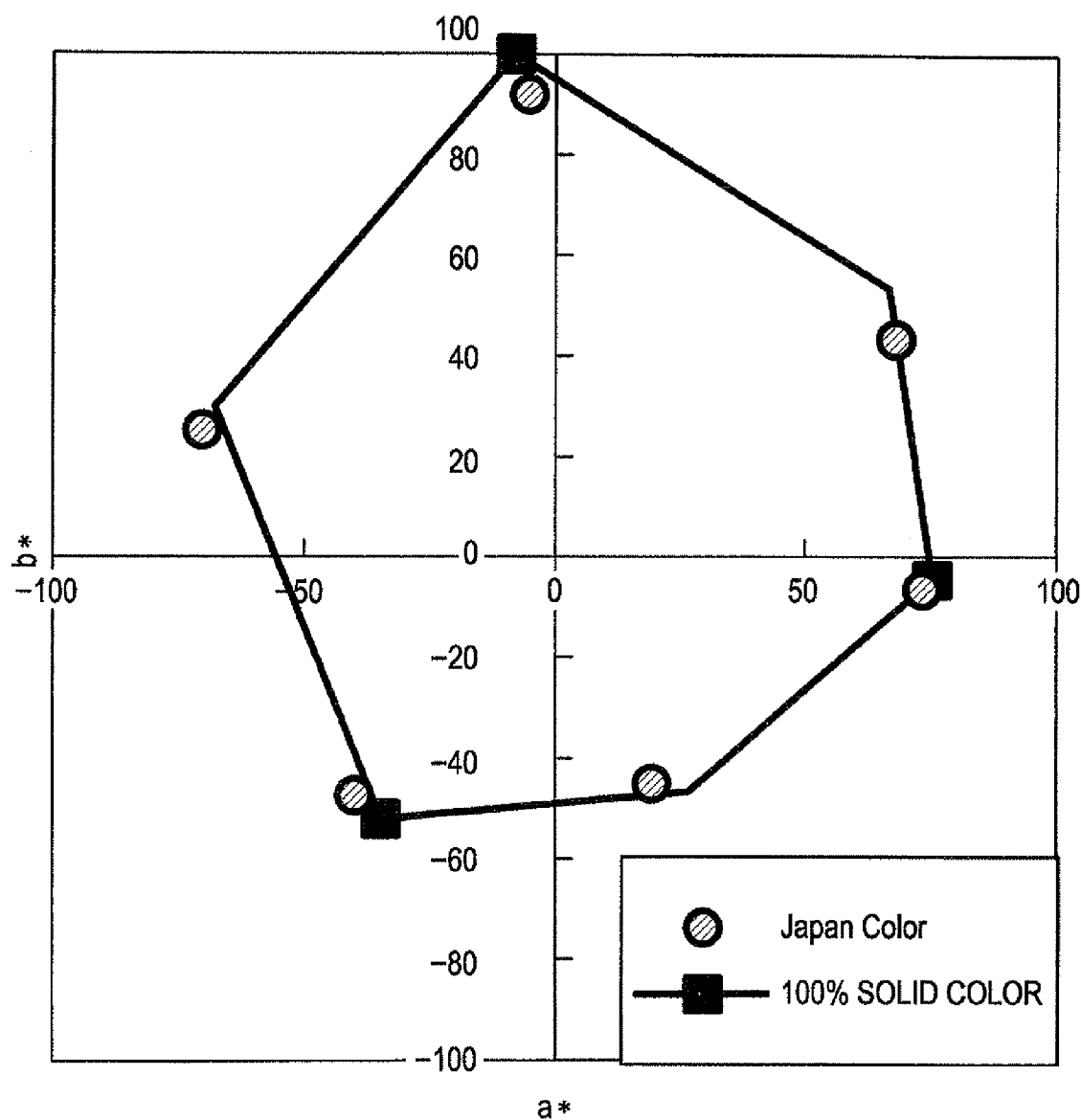
FIG. 2 is a diagram illustrating an example of a color gamut in a case where the conventional typical color expression method is used.

FIG. 2 is a diagram illustrating a color gamut in a case where the typical color expression method is used.

In FIG. 2, the hue and saturation of solid primary colors are represented by black squares, and the hue and saturation of secondary colors generated by overlapping the solid primary colors are represented by a solid line in an a*b* plane. In FIG. 2, colors expressed using halftone exist on a straight line extending between the origin and a point representing the hue and saturation of a solid color, and thus the colors in the hexagonal range defined by the solid line may be expressed. That is, the hexagonal range corresponds to a color gamut in a case where the typical color expression method is used.

In FIG. 2, the hue and saturation of Japan Color are also shown in the a*b* plane. That is, in the typical color expression method, colors close to Japan Color may be reproduced.

Note that, in the exemplary embodiment, the amount of toner in the typical color expression method is regarded as 100%, and the periphery of the color gamut in a case where the typical color expression method is used is referred to as "100% solid color".

On the other hand, according to the exemplary embodiment, it has been found that a color gamut may be changed by changing the amount of toner.

Figure 3A:
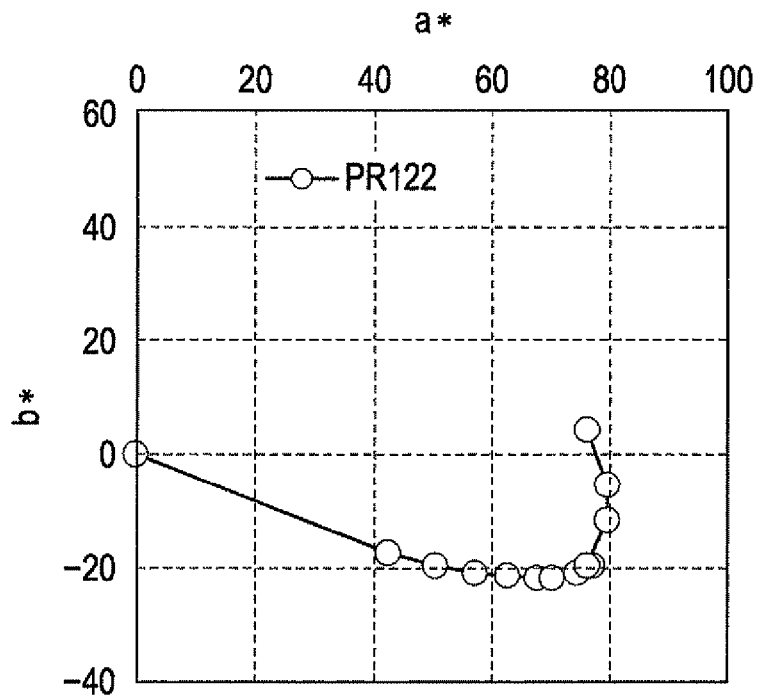
FIGS. 3A and 3B are diagrams for explaining that a hue and saturation change when the amount of toner is changed.
Figure 3B:
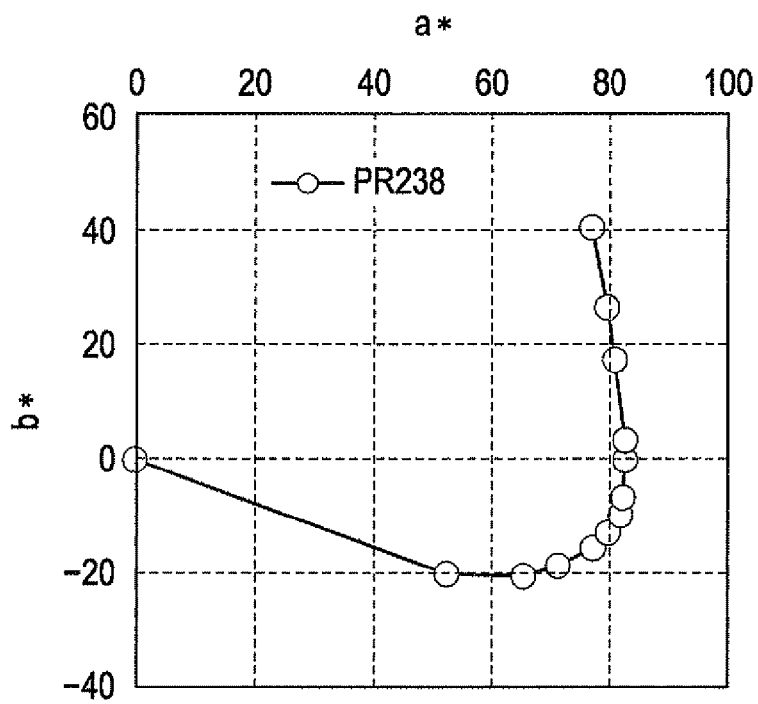

FIGS. 3A and 3B are diagrams illustrating changes in hue and saturation when the amount of magenta toner is changed. Among those figures, FIG. 3A illustrates changes in hue and saturation in a case where PR122 is used as a pigment, and FIG. 3B illustrates changes in hue and saturation in a case where PR238 is used as a pigment. In both the figures, the origin corresponds to a density of 0%, and the other points correspond to densities of 20%, 30%, 40%, 50%, 60%, 70%, 80%, 90%, 100%, 150%, 200%, and 300% along the curve with increasing distance from the origin.

Regarding cyan and yellow, similar diagrams illustrating changes in hue and saturation when the amount of toner is changed may be obtained.

On the basis of such findings, colors are expressed by changing the amount of toner in the exemplary embodiment. Such a color expression method is called density modulation. In the exemplary embodiment, the amount of toner for realizing a certain color gamut is regarded as a reference, and lighter colors are expressed using area coverage modulation.

Figure 4A:
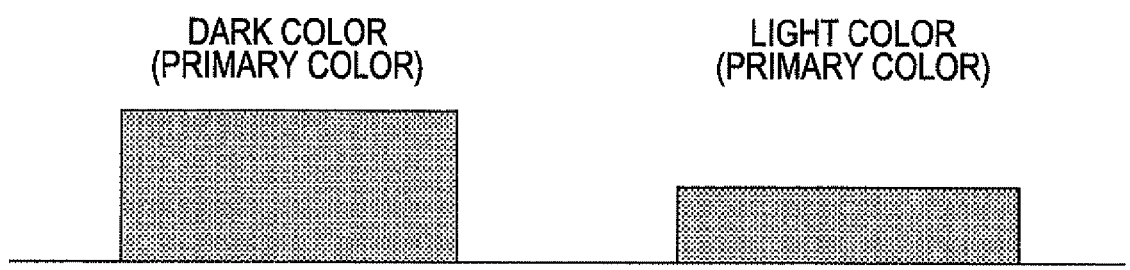
FIGS. 4A and 4B are diagrams illustrating the states of toner on a sheet in a case where a color expression method according to an exemplary embodiment of the present invention is used.
Figure 4B:
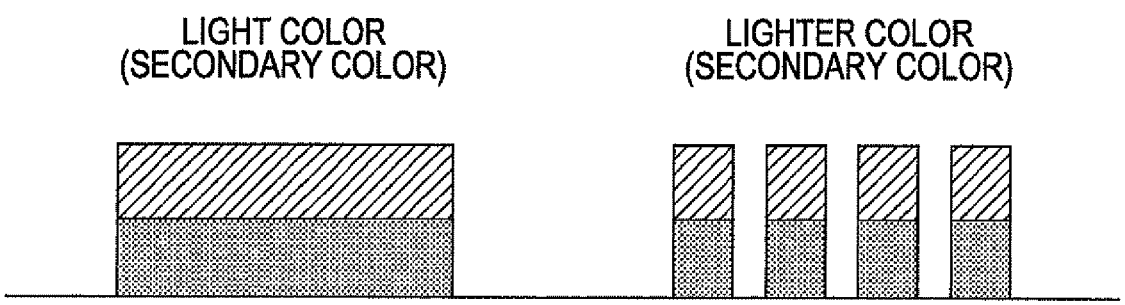

FIGS. 4A and 4B illustrate the state of toner on a sheet in a case where a dark color is reproduced and the state of toner on a sheet in a case where a light color is reproduced by using the color expression method according to the exemplary embodiment. Among those figures, FIG. 4A illustrates the state of toner when a primary color is reproduced. At this time, a light color is expressed by reducing the amount of toner. FIG. 4B illustrates the state of toner when a secondary color is reproduced by mixing the light color illustrated in FIG. 4A. At this time, since the light color illustrated in FIG. 4A is expressed by reducing the amount of toner, a color lighter than the light color is expressed using halftone. The right side in FIG. 4B is a schematic view, like the right side in FIG. 1B.

Figure 5:
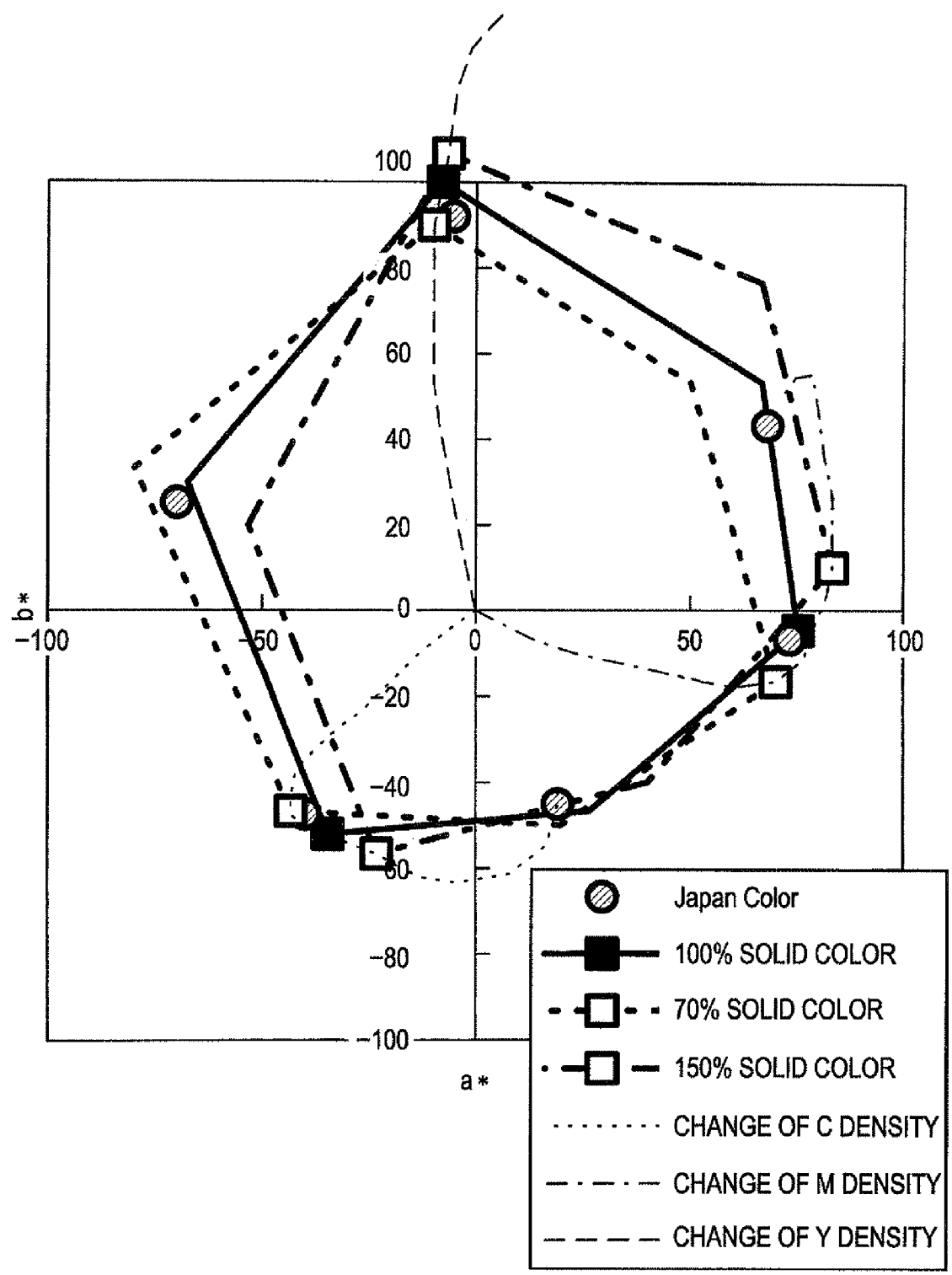
FIG. 5 is a diagram illustrating an example of a color gamut in a case where the color expression method according to the exemplary embodiment of the present invention is used.

FIG. 5 is a diagram illustrating a color gamut in a case where the color expression method according to the exemplary embodiment is used.

As illustrated in FIG. 5, the hue and saturation change along a thin chain curve when the amount of magenta toner is changed. Also, the hue and saturation change along a thin dotted curve and a thin broken curve when the amount of cyan toner and the amount of yellow toner are changed respectively. At this time, the hue and saturation change in the direction toward the origin along the curve if the amount of toner is reduced, and the hue and saturation change in the direction away from the origin along the curve if the amount of toner is increased.

In FIG. 5, as in FIG. 2, the hue and saturation of 100% solid primary colors are represented by black squares, and the hue and saturation of secondary colors generated by overlapping the 100% solid primary colors are represented by a bold solid line in an a*b* plane. Also, the color gamut in a case where the amount of toner for solid colors is 70% is represented by a bold dotted line, and the color gamut in a case where the amount of toner for solid colors is 150% is represented by a bold chain line. That is, by continuously decreasing the amount of toner from 100% to 70% or continuously increasing the amount of toner from 100% to 150%, colors in the color gamut defined by the bold chain line to the color gamut defined by the bold dotted line via the color gamut defined by the bold solid line may be evenly covered. Particularly, the color gamut on the side of a density lower than 100% is close to the sRGB color gamut of a display that cannot be covered by the foregoing typical color expression method.

Next, an image forming apparatus to which the exemplary embodiment may be applied will be described.

Figure 6:
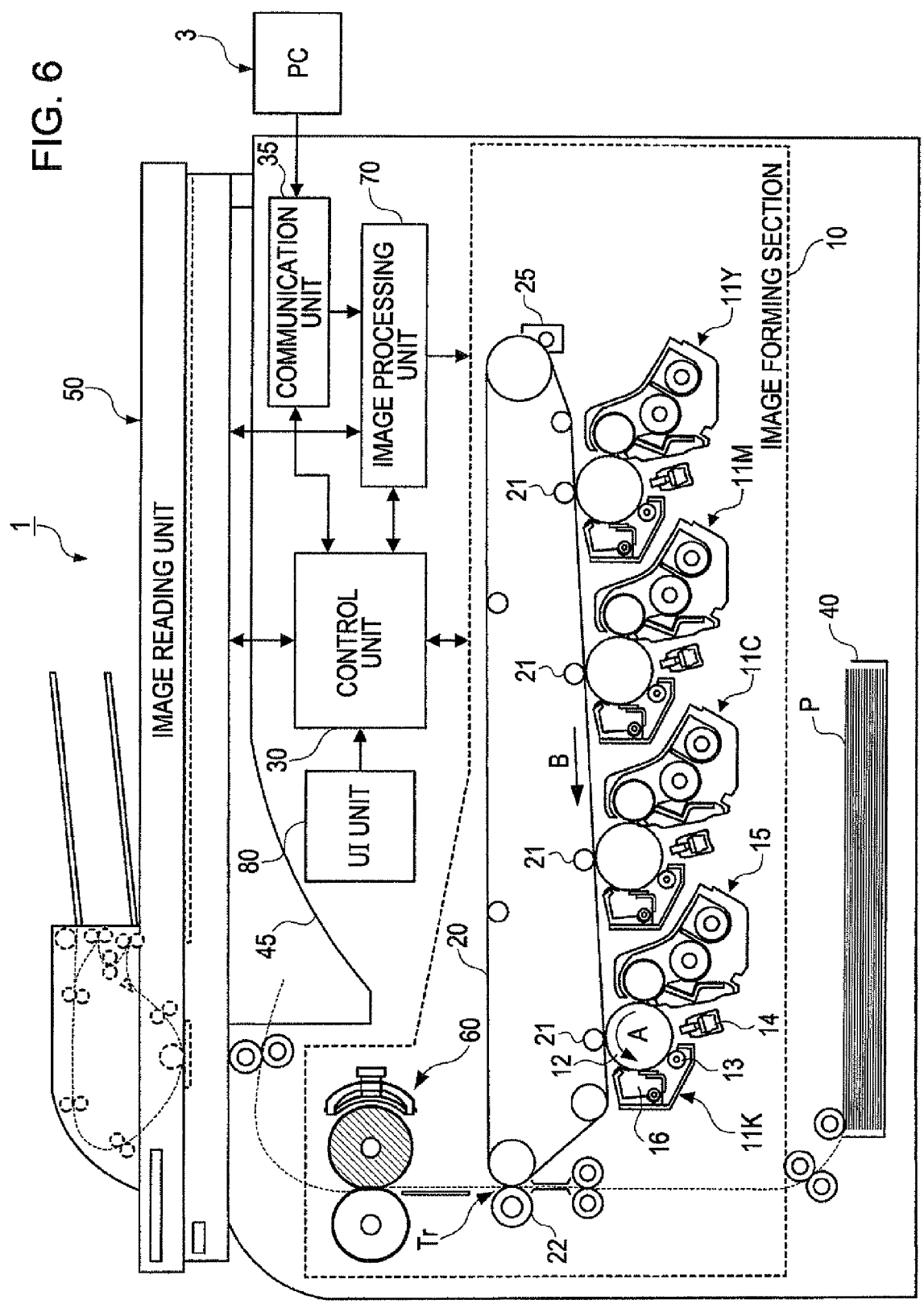
FIG. 6 is a diagram illustrating a configuration example of an image forming apparatus to which the exemplary embodiment of the present invention is applied.

FIG. 6 is a diagram illustrating a configuration example of an image forming apparatus 1 to which the exemplary embodiment is applied. The image forming apparatus 1 illustrated in FIG. 6 is a so-called tandem color printer and includes an image forming section 10 and a control unit 30. The image forming section 10 is an example of an image forming section that performs image formation on the basis of image data. The control unit 30 controls operation of the entire image forming apparatus 1. Furthermore, the image forming apparatus 1 includes a communication unit 35 that communicates with a personal computer (PC) 3 or the like to receive image data, an image reading unit 50 that reads an image from a document to generate read image data, an image processing unit 70 that performs predetermined image processing on the image data received by the communication unit 35 or the read image data generated by the image reading unit 50 and that transfers the image data to the image forming section 10, and a user interface (UI) unit 80 that accepts input of an operation from a user and that displays various pieces of information to the user.

The image forming section 10 is a section that forms an image using an electrophotographic system, for example, and includes four image forming units 11Y, 11M, 11C, and 11K (hereinafter referred to as image forming units 11) that are arranged in parallel. Each of the image forming units 11 includes, as functional members, a photoconductor drum 12 serving as an example of an image carrier on which an electrostatic latent image is formed while being rotated in the direction indicated by an arrow A and on which a toner image is formed thereafter, a charging device 13 that causes the surface of the photoconductor drum 12 to be charged at a predetermined potential, an exposure device 14 that causes the photoconductor drum 12 charged by the charging device 13 to be exposed on the basis of image data, a developing device 15 that develops an electrostatic latent image formed on the photoconductor drum 12 with toner of a corresponding color, and a drum cleaner 16 that cleans the surface of the photoconductor drum 12 after transfer.

The individual image forming units 11 have configurations substantially similar to each other except the toner accommodated in the developing device 15, and form toner images of yellow (Y), magenta (M), cyan (C), and black (K), respectively.

The image forming section 10 also includes an intermediate transfer belt 20 onto which toner images of respective colors formed on the photoconductor drums 12 of the respective image forming units 11 are transferred, and first transfer rollers 21 that sequentially transfer toner images of the respective colors formed in the respective image forming units 11 onto the intermediate transfer belt 20 (first transfer). Furthermore, the image forming section 10 includes a second transfer roller 22 that transfers all the toner images of the respective colors transferred onto the intermediate transfer belt 20 onto paper P (second transfer), which is a recording medium (recording paper), and a fuser 60 that causes the second-transferred toner images of the respective colors to be fused onto the paper P.

The image forming units 11 of the image forming section 10 form toner images of yellow (Y), magenta (M), cyan (C), and black (K), respectively, through an electrophotographic process using the foregoing functional members. The toner images of the respective colors formed in the image forming units 11 are electrostatically transferred in order onto the intermediate transfer belt 20 by the first transfer rollers 21, so that a composite toner image in which the toner images of the respective colors are superimposed is formed. The composite toner image on the intermediate transfer belt 20 is transported to a second transfer region Tr where the second transfer roller 22 is placed in accordance with the movement of the intermediate transfer belt 20 (in the direction indicated by an arrow B), and is electrostatically transferred onto the paper P supplied from a paper container 40. After that, the composite toner image that has been electrostatically transferred onto the paper P is fused onto the paper P through a fusing process performed by the fuser 60. Then, the paper P on which the fused image is formed is transported to and accumulated on a paper loading unit 45 provided at an output unit of the image forming apparatus 1.

On the other hand, the toner adhering to the photoconductor drum 12 after the first transfer (first transfer residual toner) and the toner adhering to the intermediate transfer belt 20 after the second transfer (second transfer residual toner) are removed by the drum cleaner 16 and a belt cleaner 25, respectively.

In this way, the image forming process in the image forming apparatus 1 is repeatedly performed in cycles the number of which corresponds to the number of printed sheets.

In the exemplary embodiment, in the image forming apparatus 1 capable of performing image formation by changing the amount of toner, a user is allowed to select any of a color gamut based on the conventional typical color expression method and a different color gamut such as the sRGB color gamut for forming an image, and image formation is performed with the amount of toner being adjusted in accordance with the selected color gamut.

As a method for adjusting the amount of toner, a method for controlling the amount of charge with which the photoconductor drum 12 is charged by the charging device 13 is available. Hereinafter, the control unit 30 and the image processing unit 70 will be described in detail, with the method for controlling the amount of charge on the photoconductor drum 12 being used as an example.

Figure 7:
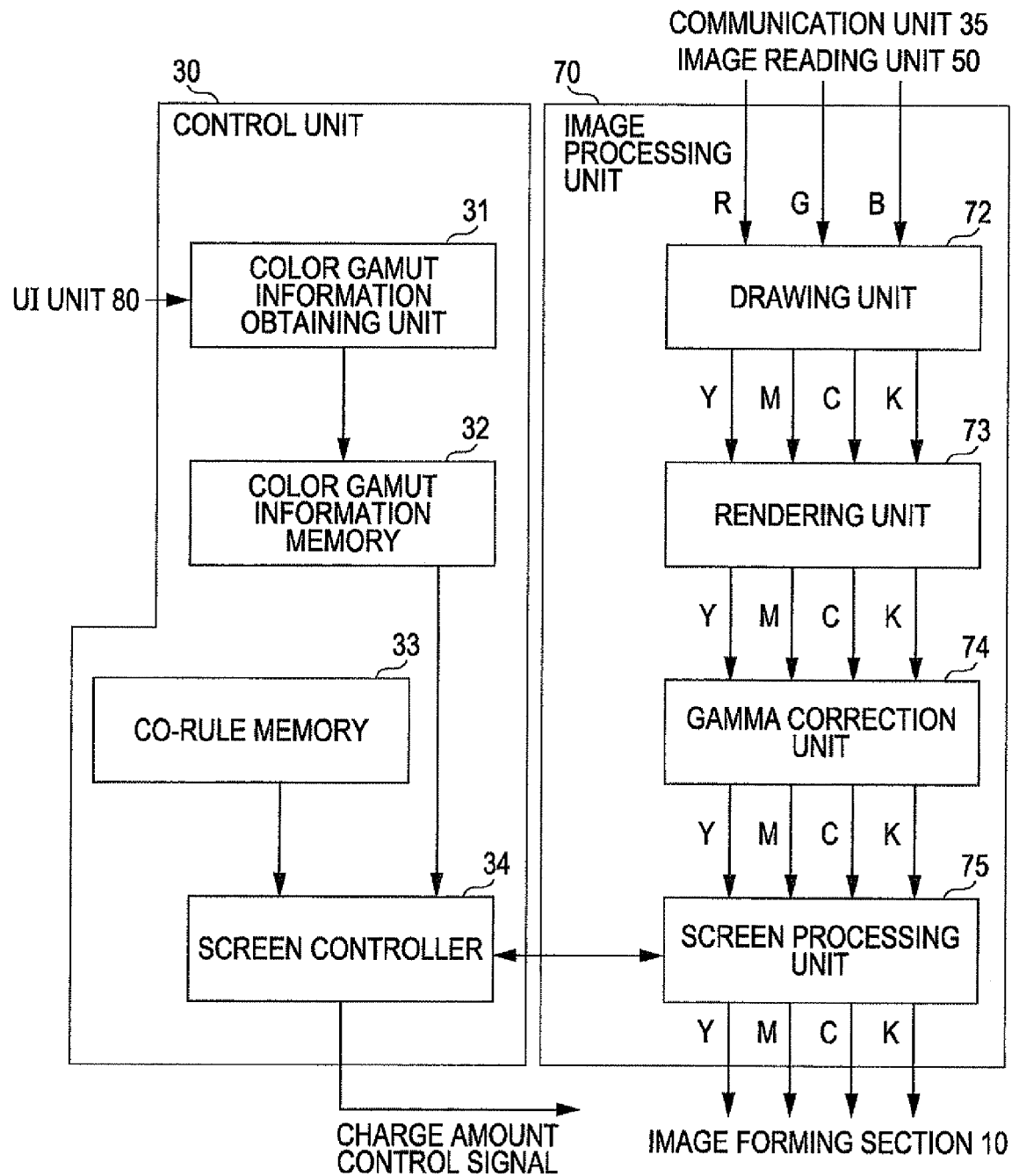
FIG. 7 is a diagram illustrating a configuration example of a control unit and an image processing unit in the image forming apparatus according to the exemplary embodiment of the present invention.

FIG. 7 illustrates a configuration example of the control unit 30 and the image processing unit 70.

The control unit 30 includes a color gamut information obtaining unit 31, a color gamut information memory 32, a co-rule memory 33, and a screen controller 34.

When a user inputs information about the color gamut to be reproduced from the UI unit 80, the color gamut information obtaining unit 31 obtains information that specifies the color gamut (color gamut information) on the basis of the input. In the exemplary embodiment, the color gamut information obtaining unit 31 is provided as an example of a determining unit that determines the color gamut to be reproduced.

The color gamut information memory 32 stores the color gamut information obtained by the color gamut information obtaining unit 31.

The co-rule memory 33 stores a rule prescribing a maximum density expressed using density modulation or a minimum density expressed using area coverage modulation (hereinafter referred to as "co-rule") in a case where the densities of individual color signals of YMC are expressed using density modulation and area coverage modulation. For example, if the density of a C signal is 35%, a method for expressing a density of 70% using density modulation and expressing a density of 50% using area coverage modulation or a method for expressing a density of 50% using density modulation and expressing a density of 70% using area coverage modulation may be used. The former method is based on a rule prescribing that density modulation is used for expression up to 70% (area coverage modulation is used for expression over 70%), in which a density of 70% is employed as an example of a first density based on a color gamut and a density of 50% is employed as an example of a second density based on the first density. The latter method is based on a rule prescribing that density modulation is used for expression up to 50% (area coverage modulation is used for expression over 50%), in which a density of 50% is employed as an example of a first density based on a color gamut and a density of 70% is employed as an example of a second density based on the first density.

The screen controller 34 controls a screen process in a screen processing unit 75 of the image processing unit 70 on the basis of the color gamut information stored in the color gamut information memory 32 and the co-rule stored in the co-rule memory 33. In the exemplary embodiment, the screen controller 34 is provided as an example of a controller that performs control so that colors in a color gamut that cannot be reproduced if area coverage modulation, not density modulation, is used for expression are included in an image.

Also, the image processing unit 70 includes a drawing unit 72, a rendering unit 73, a gamma correction unit 74, and the screen processing unit 75.

The drawing unit 72 converts color signals that are obtained through interpretation of a page description language (PDL) in the communication unit 35 or color signals transmitted from the image reading unit 50 (RGB in the figure) into color signals (YMCK) of the image forming section 10. At that time, drawing is performed with an intermediate code corresponding to the resolution of the image forming section 10.

The rendering unit 73 renders the intermediate code drawn by the drawing unit 72 into raster image data.

The gamma correction unit 74 performs gamma correction on the individual color signals of YMCK.

The screen processing unit 75 performs a screen process (binarization process) on the individual gamma-corrected color signals generated by the gamma correction unit 74 (multivalued color signals) by using a dither pattern and outputs the color signals on which the screen process has been performed (binarized color signals) to the image forming section 10. In the exemplary embodiment, the screen processing unit 75 is provided as an example of an obtaining unit that obtains color signals.

Next, operations of the control unit 30 and the image processing unit 70 will be described. Note that a co-rule for a color gamut that is reproduced using both density modulation and area coverage modulation is stored in the co-rule memory 33 prior to the operations.

First, a user inputs information specifying a color gamut to be reproduced (color gamut information) to the UI unit 80. Here, it is assumed that any of information specifying Japan Color and information specifying sRGB is input as color gamut information.

Then, in the control unit 30, the color gamut information obtaining unit 31 obtains the input color gamut information. Then, the obtained color gamut information is stored in the color gamut information memory 32.

Accordingly, the operation of the screen controller 34 starts.

Figure 8:
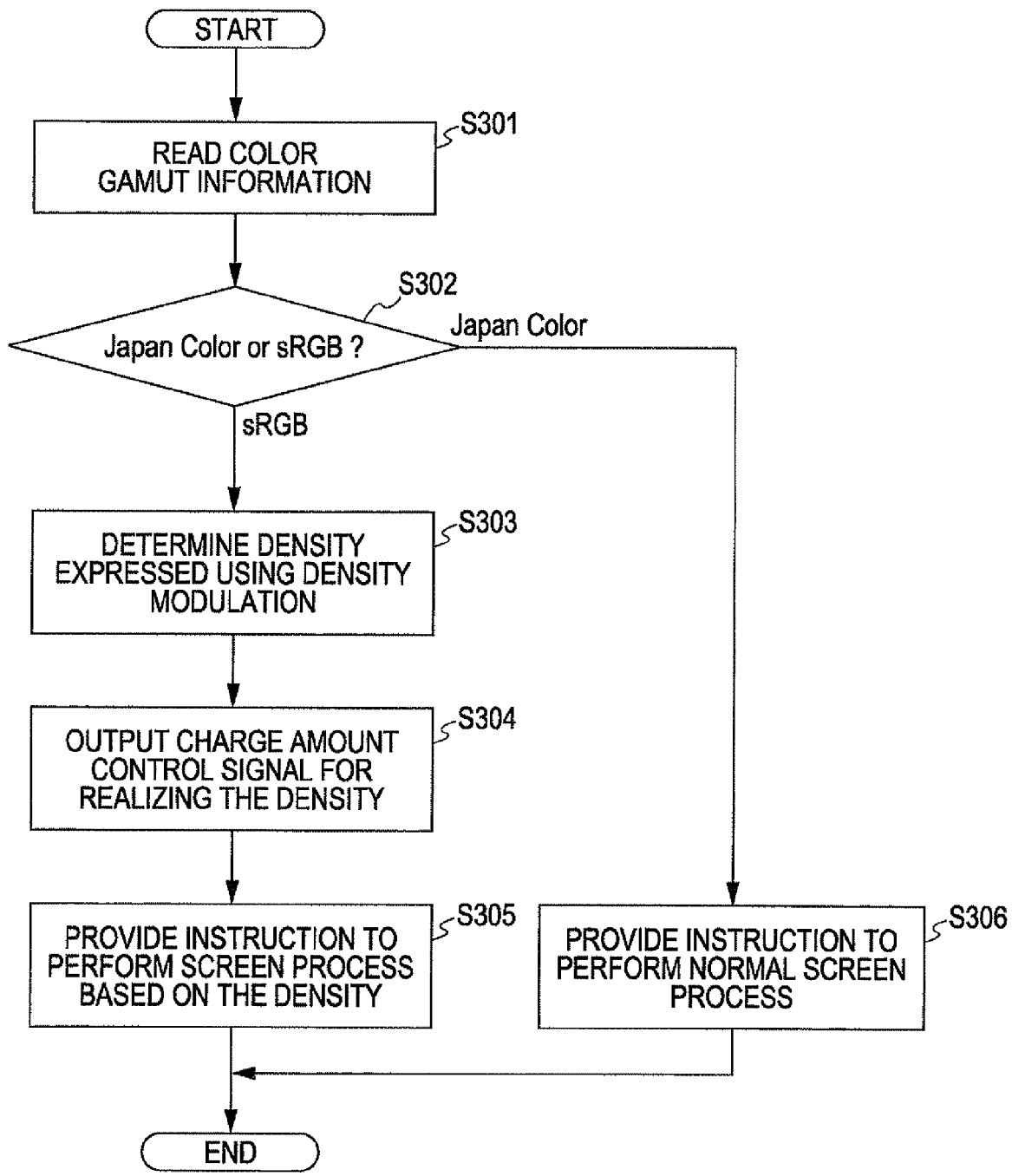
FIG. 8 is a flowchart illustrating an operation example of a screen controller in the control unit according to the exemplary embodiment of the present invention.

FIG. 8 is a flowchart illustrating an operation example of the screen controller 34.

First, the screen controller 34 reads the color gamut information stored in the color gamut information memory 32 (step S301).

Subsequently, the screen controller 34 determines whether the read color gamut information is information specifying Japan Color or information specifying sRGB (step S302).

As a result, if the screen controller 34 determines that the read color gamut information is information specifying sRGB, the screen controller 34 determines a maximum percentage of density to be expressed using density modulation with reference to the co-rule stored in the co-rule memory 33 (step S303). For example, if a co-rule prescribing that density modulation is used for expression up to 70% for sRGB is stored in the co-rule memory 33, the screen controller 34 determines that density modulation is used for expression up to a density of 70%.

Accordingly, the screen controller 34 outputs a charge amount control signal for setting a charge amount that realizes the density determined in step S303 to the charging device 13 of the image forming section 10 (step S304).

Then, the screen controller 34 instructs the screen processing unit 75 of the image processing unit 70 to perform a screen process in which density modulation is used for expression up to the density determined in step S303 (step S305). For example, when it is assumed that an instruction to use density modulation for expression up to a density of 70% is provided to the screen processing unit 75, the screen processing unit 75 performs a screen process on the individual color signals of YMC input via the drawing unit 72, the rendering unit 73, and the gamma correction unit 74 under the assumption that density modulation is used for expression up to the density specified by the screen controller 34. For example, if the density of the input C signal is 35% and if the density specified by the screen controller 34 is 70%, the screen processing unit 75 performs a screen process for setting the density to 50% and outputs the individual color signals on which the screen process has been performed to the image forming section 10.

On the other hand, if the screen controller 34 determines in step S302 that the read color gamut information is information specifying Japan Color, the screen controller 34 instructs the screen processing unit 75 of the image processing unit 70 to perform a normal screen process (a screen process based on the typical color expression method described above with reference to FIGS. 1A, 1B, and 2) in step S306. Accordingly, the screen processing unit 75 performs the normal screen process on the individual color signals of YMC input via the drawing unit 72, the rendering unit 73, and the gamma correction unit 74, and outputs the individual color signals on which the screen process has been performed to the image forming section 10.

In the exemplary embodiment, a color gamut that cannot be reproduced using the conventional typical color expression method is reproduced in the image forming apparatus 1 that forms an image using four colors YMCK. Alternatively, in a more generalized manner, a color gamut that cannot be reproduced by the conventional typical color expression method may be reproduced in an image forming apparatus that forms an image using n colors.

In the exemplary embodiment, a color gamut to be reproduces is specified in accordance with an instruction of a user provided from the UI unit 80, but another method is also acceptable. For example, an image input from the communication unit 35 or the image reading unit 50 may be analyzed and a color gamut to be reproduced may be specified on the basis of an analysis result. As an analysis method for such an image, the following method may be used, for example. The frequency of appearance of colors that are to be desirably expressed using sRGB in the image is determined. If the frequency of appearance of such colors is high, sRGB is specified as a color gamut to be reproduced.

Furthermore, in the exemplary embodiment, an instruction to perform a normal screen process is provided without referring to the co-rule stored in the co-rule memory 33 in the case of Japan Color, as illustrated in FIG. 8. However, a rule prescribing that density modulation is used for expression up to a density of 100% and that area coverage modulation is used for expression over a density of 100% may be stored for Japan Color in the co-rule memory 33, and an instruction to perform the normal screen process may be provided by referring to the rule.

Furthermore, in the exemplary embodiment, a method for changing the amount of toner by controlling the amount of charge on the photoconductor drum 12 is employed as a method for expressing the density of a color signal using density modulation, but another method may also be employed. For example, the amount of toner may be changed by performing an image formation process plural times, the process including a series of operations of first-transferring toner images of respective colors formed by the image forming units 11Y, 11M, 11C, and 11K onto the intermediate transfer belt 20, second-transferring the first-transferred toner images of the respective colors onto a recording medium from the intermediate transfer belt 20, and fusing the second-transferred toner images of the respective colors onto the recording medium by the fuser 60. Note that such a method is realized by providing a path for transporting again the recording medium onto which the toner images are once fused by the fuser 60 to the image forming units 11Y, 11M, 11C, and 11K.

In the exemplary embodiment, the control unit 30 in the image forming apparatus 1 performs control of changing a color gamut. Alternatively, this process may be performed by a multi-purpose computer.

Now, a description will be given of a hardware configuration of a computer 90 serving as the multi-purpose computer.

Figure 9:
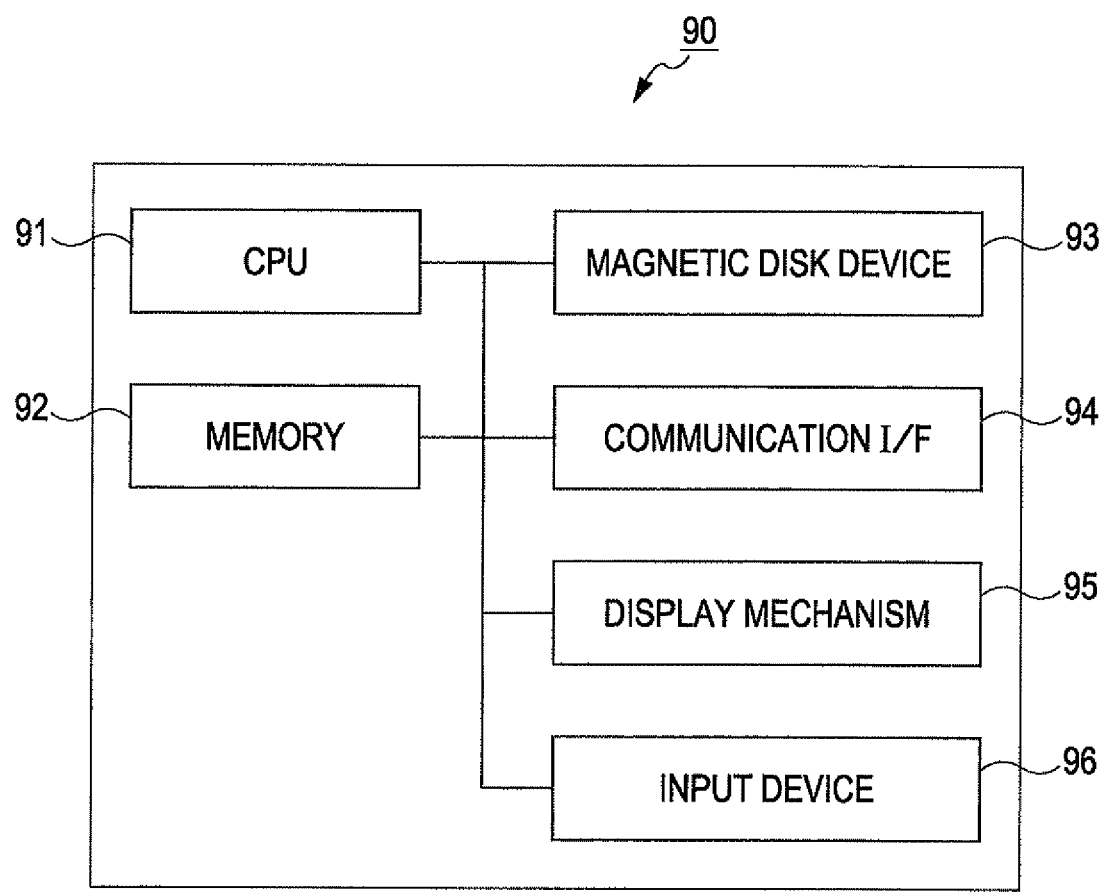
FIG. 9 is a hardware configuration diagram of a computer capable of realizing the exemplary embodiment of the present invention.

FIG. 9 is a diagram illustrating a hardware configuration of the computer 90.

As illustrated in FIG. 9, the computer 90 includes a central processing unit (CPU) 91 serving as an operating unit, a memory 92 serving as a memory, and a magnetic disk device (hard disk drive (HDD)) 93. Here, the CPU 91 executes various types of software, such as an operating system (OS) and an application, and realizes the foregoing functions. The memory 92 is a storage area that stores various types of software and data used for execution of the software. The magnetic disk device 93 is a storage area that stores data input to the various types of software and data output from the various types of software.

Furthermore, the computer 90 includes a communication interface (I/F) 94 for performing communication with the outside, a display mechanism 95 including a video memory and a display, and an input device 96, such as a keyboard and a mouse.

The program that realizes the exemplary embodiment may be provided by being stored on a recording medium, such as a compact disc read only memory (CD-ROM), as well as through a communication unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an obtaining unit configured to obtain color signals of an image;
   an image forming section configured to form the image on a medium using an image forming material, and
   a controller configured to change a color gamut of the image forming apparatus from a first color gamut reproduced using only area coverage modulation with N color components, N being a natural number, to a second color gamut reproduced using, area coverage modulation and density modulation with the N color components,
   wherein the density modulation changes an amount of the image forming material, and
   wherein colors are included in the second color gamut that are not included in the first color gamut.

2. The image forming apparatus according to claim 1, further comprising:
   a determining unit configured to determine a color gamut to be reproduced based on an instruction provided from outside or analysis of the image,
   wherein the controller expresses a first density by using density modulation, the first density being based on the color gamut determined by the determining unit, and expresses a second density by using area coverage modulation, the second density being based on the first density.

3. The image forming apparatus according to claim 1,
   wherein the image forming section forms the image on the medium, the image being based on an image that is formed by causing the image forming material to adhere to an electrostatic latent image, the electrostatic latent image being formed by causing an image carrier to be charged and by performing exposure on the basis of the color signals, and
   wherein the controller expresses the densities of the N color components by using density modulation by changing an amount of charge on the image carrier.

4. The image forming apparatus according to claim 1,
   wherein the image forming section forms the image on the medium by performing an image formation process of fusing the image on the medium, the image being based on an image that is formed by causing the image forming material to adhere to an electrostatic latent image, the electrostatic latent image being formed by causing an image carrier to be charged and by performing exposure on the basis of the color signals, and
   wherein the controller expresses the densities of the N color components by using density modulation by performing the image formation process a plurality of times.

5. An image formation control apparatus comprising:
   an obtaining unit configured to obtain color signals of an image; and
   a controller configured to perform control so that the image is formed on a medium using an image forming material by changing a color gamut of the image forming apparatus from a first color gamut reproduced using only area coverage modulation with N color components, N being a natural number, to a second color gamut reproduced using area coverage modulation and density modulation with the N color components,
   wherein the density modulation changes an amount of the image forming material, and
   wherein colors are included in the second color gamut that are not included in the first color gamut.

6. The image formation control apparatus according to claim 5, further comprising:
   a determining unit configured to determine a color gamut to be reproduced based on an instruction provided from outside or analysis of the image,
   wherein the controller expresses a first density by using density modulation, the first density being based on the color gamut determined by the determining unit, and expresses a second density by using area coverage modulation, the second density being a density based on the first density.

7. A non-transitory computer readable medium storing a program causing a computer to execute a process, the process comprising:
   obtaining color signals of an image; and
   performing control so that the image is formed on a medium using an image forming material by changing a color gamut of the image forming apparatus from a first color gamut reproduced using only area coverage modulation with N color components, N being a natural number, to a second color gamut reproduced using area coverage modulation and density modulation with the N color components,
   wherein the density modulation changes an amount of the image forming material and
   wherein colors are included in the second color gamut that are not included in the first color gamut.

* * * * *